United States Patent
Brown et al.

(10) Patent No.: US 7,127,456 B1
(45) Date of Patent: Oct. 24, 2006

(54) SYSTEM AND METHOD FOR LOGGING DATABASE QUERIES

(75) Inventors: Douglas P. Brown, Rancho Santa Fe, CA (US); Delynn Anne Kelly, Poway, CA (US); Diana Lynn Thomas, Vista, CA (US)

(73) Assignee: NCR Corp., Dayton, OH (US)

( * ) Notice: Subject to any disclaimer, the term of this patent is extended or adjusted under 35 U.S.C. 154(b) by 384 days.

(21) Appl. No.: 10/310,341

(22) Filed: Dec. 5, 2002

(51) Int. Cl.
*G06F 17/30* (2006.01)
*G06F 7/00* (2006.01)

(52) U.S. Cl. .................... 707/3; 707/2; 707/5
(58) Field of Classification Search .............. 707/3, 707/2, 5
See application file for complete search history.

(56) References Cited

U.S. PATENT DOCUMENTS

| | | | |
|---|---|---|---|
| 5,809,491 A * | 9/1998 | Kayalioglu et al. ......... 706/45 |
| 6,219,689 B1 * | 4/2001 | Mori ...................... 718/101 |
| 6,332,167 B1 * | 12/2001 | Peters et al. ............. 719/318 |
| 6,587,847 B1 * | 7/2003 | Stier et al. ................ 706/50 |
| 6,594,653 B1 * | 7/2003 | Colby et al. ................ 707/3 |
| 6,640,218 B1 * | 10/2003 | Golding et al. ............. 707/2 |
| 6,665,716 B1 * | 12/2003 | Hirata et al. ............. 709/224 |
| 6,698,013 B1 * | 2/2004 | Bertero et al. ............ 717/127 |
| 6,721,765 B1 * | 4/2004 | Ghosh et al. ............. 707/202 |
| 6,882,994 B1 * | 4/2005 | Yoshimura et al. .......... 707/3 |
| 6,938,035 B1 * | 8/2005 | Driesch et al. ............. 707/3 |
| 2002/0010706 A1 * | 1/2002 | Brickell et al. ........... 707/200 |
| 2005/0192978 A1 * | 9/2005 | Lightstone et al. ........ 707/100 |

\* cited by examiner

*Primary Examiner*—Don Wong
*Assistant Examiner*—Thanh-Ha Dang
(74) *Attorney, Agent, or Firm*—Baker Botts LLP (57) ABSTRACT

A method for logging database queries includes receiving a request to log a plurality of database queries. Each database query is associated with an execution time. The method also includes summarizing at least some of the database queries in a log based at least partially on the execution time associated with each of the database queries.

22 Claims, 6 Drawing Sheets

SUMMARIZED LOG 408a

| PROCESSOR ID | COLLECTION TIME STAMP | USER ID | ACCOUNT NAME | SESSION ID | QUERY COUNT | QUERY SECONDS | LOW HISTOGRAM 522a | HIGH HISTOGRAM 522b |
|---|---|---|---|---|---|---|---|---|
| $ID_1$ | $T_1$ | $UID_1$ | $N_1$ | $SID_1$ | 3 | 7 | 0 | 5 |
| $ID_1$ | $T_1$ | $UID_1$ | $N_1$ | $SID_1$ | 7 | 55 | 5 | 10 |
| $ID_1$ | $T_1$ | $UID_1$ | $N_1$ | $SID_1$ | 4 | 43 | 10 | 15 |
| $ID_1$ | $T_1$ | $UID_1$ | $N_1$ | $SID_1$ | 2 | 68 | 15 | 65,535 |
| $ID_1$ | $T_1$ | $UID_2$ | $N_2$ | $SID_2$ | 27 | 121 | 17 | 0 |
| $ID_1$ | $T_2$ | $UID_1$ | $N_1$ | $SID_1$ | 5 | 18 | 0 | 5 |
| $ID_1$ | $T_2$ | $UID_1$ | $N_1$ | $SID_1$ | 18 | 241 | 10 | 15 |
| $ID_1$ | $T_2$ | $UID_2$ | $N_2$ | $SID_2$ | 1 | 28 | 15 | 65,535 |
| $ID_1$ | $T_2$ | $UID_2$ | $N_2$ | $SID_2$ | 21 | 142 | 17 | 0 |
| ... | ... | ... | ... | ... | ... | ... | ... | ... |
| 504 | 506 | 508 | 510 | 512 | 514 | 516 | 518 | 520 |

502

FULL LOG 408b

| PROCESSOR ID | COLLECTION TIMESTAMP | QUERY ID | USER ID | ACCOUNT NAME | SESSION ID | LOGICAL HOST ID | START TIME | FIRST STEP TIME | FIRST RESPONSE TIME | LAST RESPONSE TIME | NUMBER OF STEPS | TOTAL CPU TIME | TOTAL I/O COUNT |
|---|---|---|---|---|---|---|---|---|---|---|---|---|---|
| $ID_1$ | $T_1$ | $QID_1$ | $UID_1$ | $N_1$ | $SID_1$ | $HID_1$ | $ST_1$ | $FS_1$ | $FR_1$ | $LR_1$ | $NS_1$ | $CPU_1$ | $IO_1$ |
| $ID_1$ | $T_2$ | $QID_2$ | $UID_1$ | $N_2$ | $SID_2$ | $HID_2$ | $ST_2$ | $FS_2$ | $FR_2$ | $LR_2$ | $NS_2$ | $CPU_2$ | $IO_2$ |
| $ID_2$ | $T_3$ | $QID_3$ | $UID_2$ | $N_3$ | $SID_3$ | $HID_3$ | $ST_3$ | $FS_3$ | $FR_3$ | $LR_3$ | $NS_3$ | $CPU_3$ | $IO_3$ |
| ... | | | | | | | | | | | | | |

*FIG. 6*

QUERY RULES TABLE 406 / 702

| USER ID | ACCOUNT NAME | TIME BUCKET FLAG | THRESHOLD FLAG | LOW VALUE | MIDDLE VALUE | HIGH VALUE | THRESHOLD VALUE |
|---|---|---|---|---|---|---|---|
| $UID_1$ | $N_1$ | 1 | 0 | 5 | 10 | 15 | - |
| $UID_1$ | $N_2$ | 0 | 1 | - | - | - | 10 |
| $UID_2$ | $N_3$ | 0 | 1 | - | - | - | 10 |
| ... | | | | | | | |

SYSTEM AND METHOD FOR LOGGING DATABASE QUERIES

BACKGROUND

Conventional database systems often execute a large number of queries for users. The number of queries processed by typical database systems has been increasing as the database systems continue to grow larger and capable of storing more information. Conventional database systems also typically monitor the queries executed by the database systems. For example, a database system may log each query executed by the system and information about each query, such as the amount of system resources used during execution of the query.

SUMMARY

This disclosure provides an improved system and method for logging database queries that reduce or eliminate at least some of the shortcomings associated with prior approaches.

In one aspect, a method for logging database queries includes receiving a request to log a plurality of database queries. Each database query is associated with an execution time. The method also includes summarizing at least some of the database queries in a log based at least partially on the execution time associated with each of the database queries.

One or more technical features may be provided according to various embodiments of this disclosure. Particular embodiments of this disclosure may exhibit none, some, or all of the following features depending on the implementation. For example, in one example, a system for logging database queries is provided. In particular, the system summarizes at least some of the database queries in a log. As a particular example, the system could count the number of queries having an execution time falling within different time buckets established by a user. As another particular example, the system could compare the execution time of a query to a threshold time. Queries with an execution time less than or equal to the threshold could be counted, and queries with an execution time greater than the threshold could be fully logged. In these examples, the system can summarize some or all of the queries in a log by counting the queries. The system may not need to fully log all of the queries executed by the system, which reduces the number of queries to be fully logged. This may help to reduce the overhead imposed by the logging process. This may also help to increase the operating speed of the system.

Other technical features may be readily apparent to one skilled in the art from the following figures, descriptions, and claims.

DETAILED DESCRIPTION

Figure 1:
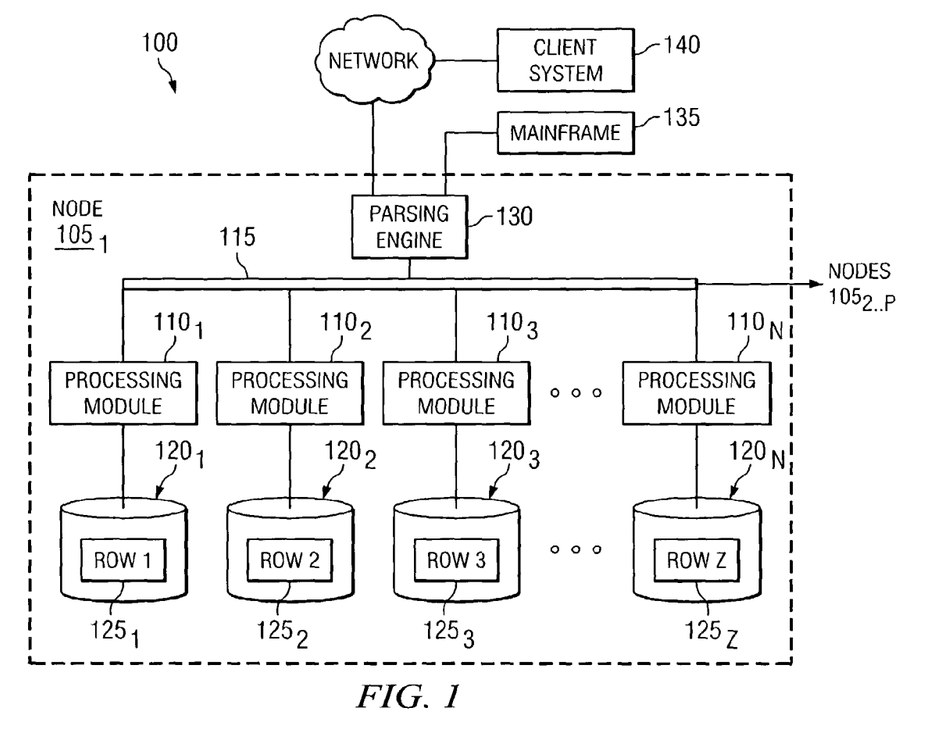
FIG. 1 is a block diagram of a node of a database system.

The query logging technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_1 \ldots _N$ by a hash bucket map. The characteristics of the columns chosen for the primary index determine how evenly the rows are distributed.

Figure 2:
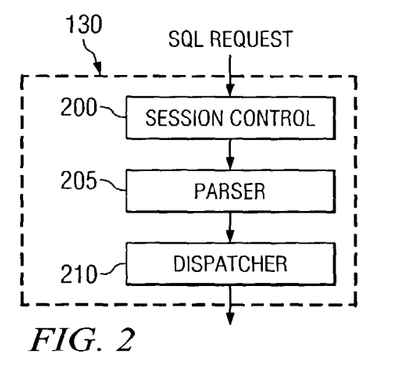
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
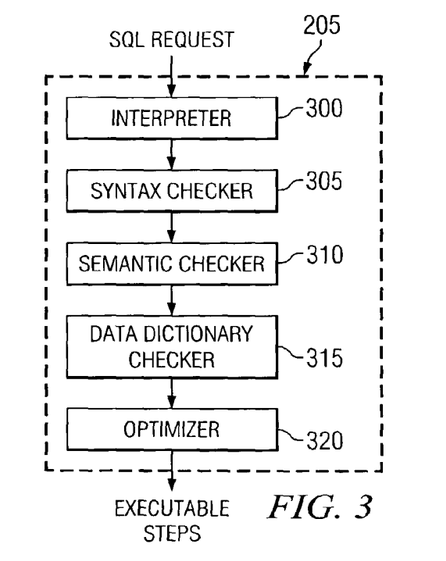
FIG. 3 is a flowchart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Figure 4:
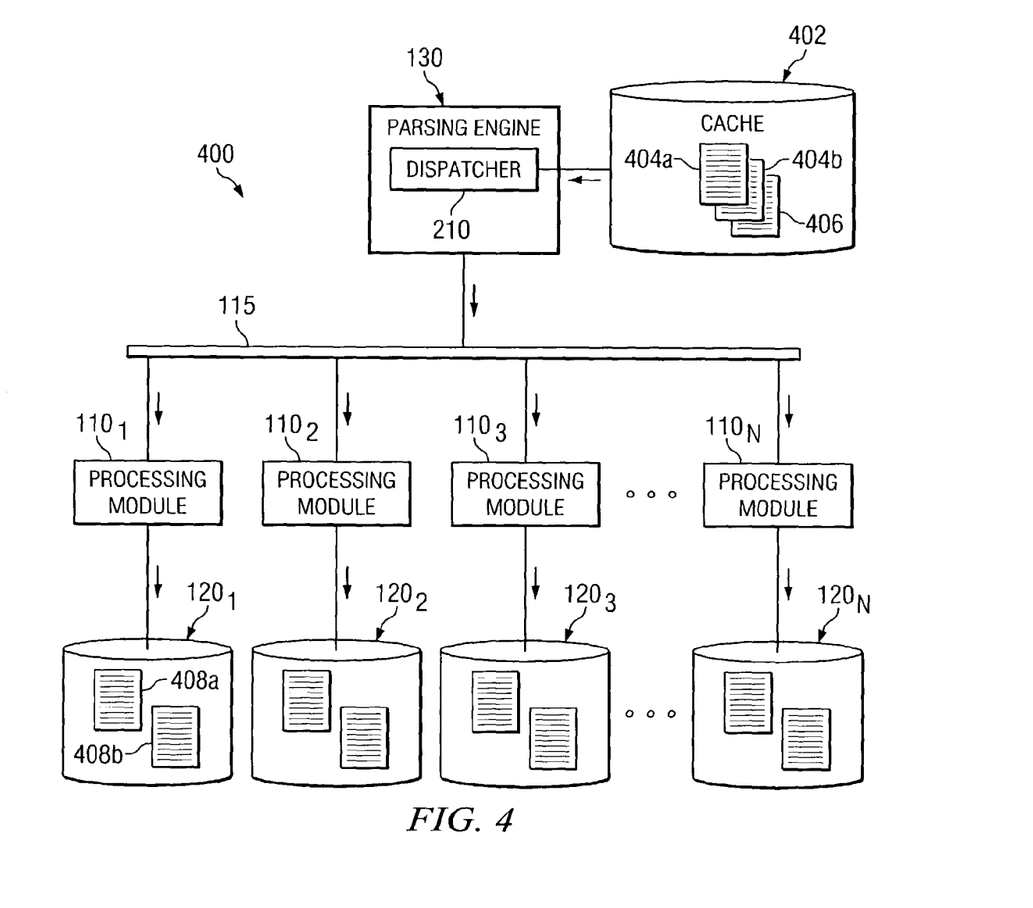
FIG. 4 is a block diagram of a memory arrangement for logging database queries.
Figure 5:
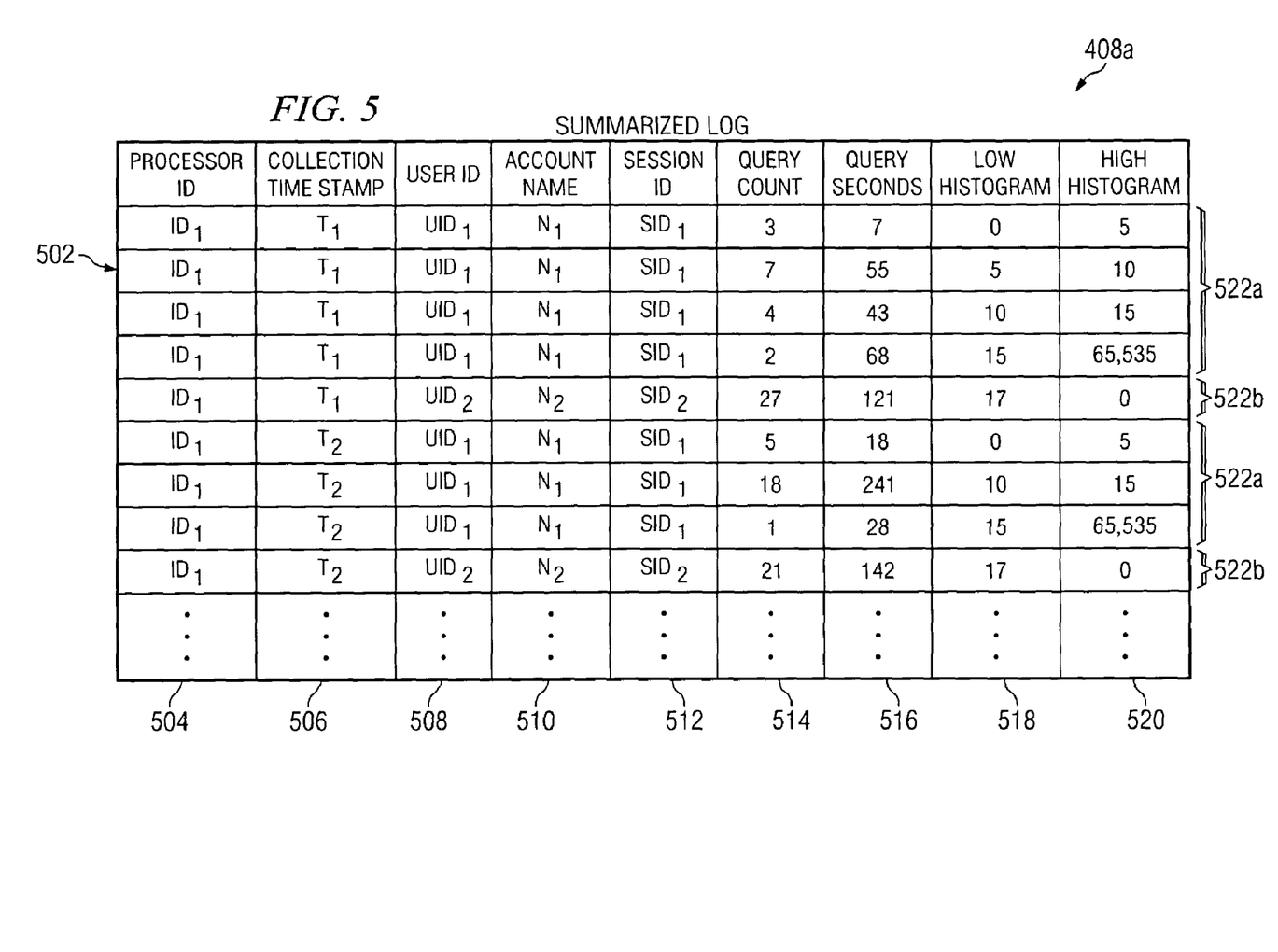
FIG. 5 is a block diagram of a summarized query log.
Figure 6:
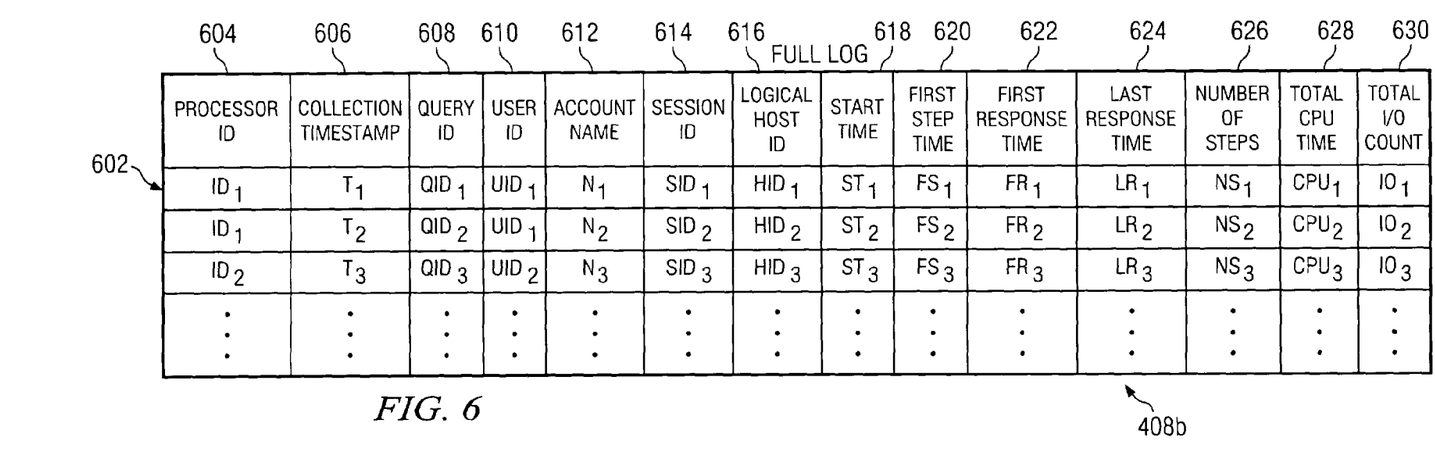
FIG. 6 is a block diagram of a full query log.

A memory arrangement 400, illustrated in FIG. 4, supports the logging of database queries in DBS 100. In this example, parsing engine 130 has access to a cache 402. Cache 402 represents any suitable memory or memories that can be used by parsing engine 130 to store and retrieve information. In the illustrated example, cache 402 includes query data 404 and a query rules table 406. Query data 404 represents information about queries executed by a node 105. For example, query data 404a could represent summarized query data, and query data 404b could represent full query data. The query data 404 in cache 402 is used to update one or more query logs 408 in data-storage facilities 120. Log 408a could represent a summarized query log, and log 408b could represent a full query log. A "full" query log 408b stores specific information associated with one or more queries, such as the user and user account that submitted a query, the times at which various events occurred during execution of the query, and the total processing time and total number of input/output (I/O) operations associated with the query. A "summarized" query log 408a contains summarized information about one or more queries. As a particular example, summarized query log 408a may identify the number of queries having execution times that fall within a particular range of execution times. One example of a summarized query log 408a is shown in FIG. 5, which is described below. One example of a full query log 408b is shown in FIG. 6, which is also described below.

In one aspect of operation, queries in DBS 100 are logged using a threshold option. Dispatcher 210 monitors the execution time of a query and compares the execution time to a threshold time. If the execution time falls below the threshold time, dispatcher 210 increments a counter. The value of the counter may be stored in cache 402 as summarized query data 404a. If the execution time of a query is greater than the threshold time, dispatcher 210 writes information about the query to cache 402 as full query data 404b. Depending on the implementation, information about a query having an execution time equal to the threshold could be stored as summarized query data 404a or as full query data 404b. For longer-term storage, the summarized query data 404a may then be written to summarized query log 408a, and the full query data 404b may be written to full query log 408b. In this way, dispatcher 210 may not need to log every single query in log 408b.

In another aspect of operation, queries in DBS 100 are logged using a time bucket option. One or more time buckets are associated with one or more counters, and each time bucket is also associated with a range of execution times. Dispatcher 210 monitors the execution time of a query and determines which time bucket has a range of execution times that includes the identified execution time. Dispatcher 210 then increments the counter associated with the identified time bucket. The values of the counter may be stored in cache 402 as summarized query data 404a. The summarized query data 404a may then be written to summarized query log 408a. In this example, dispatcher 210 summarizes all queries in log 408a and need not fully log any queries.

Figure 7:
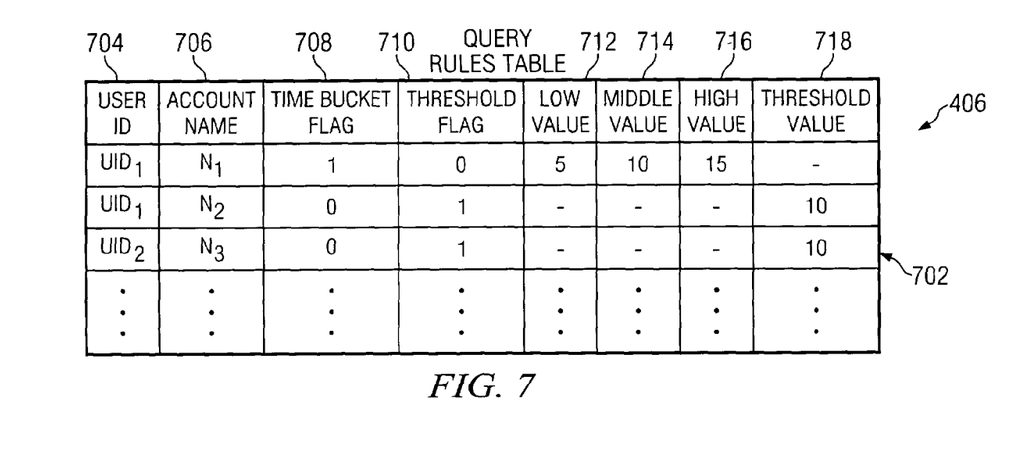
FIG. 7 is a block diagram of a query rules table.

Query rules table 406 identifies how dispatcher 210 logs queries submitted by particular users in DBS 100. For example, query rules table 406 could identify whether a user wishes to use the threshold option, the time bucket option, or neither option to log queries submitted by that user. If the user wishes to use the threshold option, query rules table 406 identifies the threshold time to be used by dispatcher 210. If the user wishes to use the time bucket option, query rules table 406 identifies a range of execution times for each of the one or more time buckets. One example of a query rules table 406 is shown in FIG. 7, which is described below.

As described above, dispatcher 210 uses the query data 404 in cache 402 to update one or more logs 408 in data-storage facilities 120. In this example, cache 402 represents a temporary storage area for the query data 404, and logs 408 in data-storage facilities 120 represent a longer-term storage area for the query data 404. To update a log 408, dispatcher 210 communicates at least a portion of the query data 404 in cache 402 to one or more processing modules 110.

In an example system, dispatcher 210 communicates query data 404 to processing modules 110 in response to a triggering event. The triggering event could, for example, represent a specified amount of time (such as a ten minute period) elapsing, query data 404 reaching a specified size or specified percentage of the capacity of cache 402, a command being received from a user, or any other suitable trigger. The triggering event causes dispatcher 210 to communicate query data 404 to one or more processing modules 110.

Processing modules 110 receive the query data 404 and store the query data 404 in one or more logs 408. In an example system, dispatcher 210 stores query data 404 in cache 402 in a file system format. The file system format is also used by processing modules 110 to store information in data-storage facilities 120. By writing the query data 404 in cache 402 in a file system format, processing modules 110 need not convert the query data 404 before storing it in data-storage facilities 120. This may help to reduce the load placed on processing modules 110. In a particular system, the full query data 404b is written in file system format, while the summarized query data 404a is not.

Figure 8:
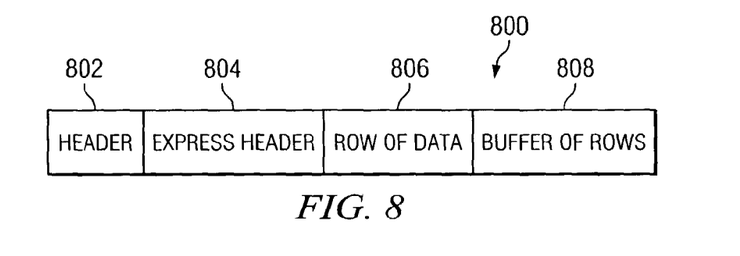
FIG. 8 is a block diagram of an express request used to update a log.

To help further reduce the load placed on node 105, an express request can be used by dispatcher 210 to communicate query data 404 to processing modules 110. In an example system, when parsing engine 130 receives queries or other commands, parsing engine 130 executes a step building process to divide the command into one or more steps. Dispatcher 210 then communicates the various steps to processing modules 110 for execution. An express request is a message sent from parsing engine 130 to processing modules 110 without requiring parsing engine 130 to perform the step building process. One example of an express request is shown in FIG. 8, which is described below.

In an example system, parsing engine 130 communicates with processing modules 110 over network 115. Network 115 carries messages between parsing engine 130 and processing modules 110. Network 115 could, for example, carry broadcast messages, point-to-point messages, and point-to-multipoint messages between parsing engine 130 and processing modules 110. Network 115 could also merge information from multiple processing modules 110 and deliver a consolidated set of information to parsing engine 130, such as when multiple processing modules 110 retrieve information from data-storage facilities 120 in response to a query. Network 115 could further provide automatic load balancing and automatic reconfiguration after detection of a fault in one or more processing modules 110. In a particular system, network 115 represents a dual redundant, bi-directional interconnect network. In this particular system, node 105 may support a parallel database extension (PDE) to enable multiple processing modules 110 to execute on the same node 105 and communicate over network 115.

While dispatcher 210 has been and may be described as logging database queries, dispatcher 210 could also log individual query steps. In this example, a query is divided into one or multiple steps, and the execution time of each step is identified. Dispatcher 210 may then increment a counter and/or fully log an individual step based on the identified execution time of the step.

Although FIG. 4 illustrates one example of a memory arrangement 400 for logging database queries, various changes may be made to memory arrangement 400. For example, additional divisions among query data 404 and/or logs 408 could be used in node 105.

A summarized query log 408a, illustrated in FIG. 5, includes one or more entries 502. Each entry 502 includes summarized information about zero or more queries executed by DBS 100. The queries could be summarized using the threshold option and/or the time bucket option described above. The fields shown in FIG. 5 are for illustration only. Other or additional fields can be used to describe queries executed by DBS 100.

Processor identifier 504 identifies the parsing engine 130 that processes the queries being summarized in an entry 502. Collection timestamp 506 identifies the time when the information in entry 502 was sent from parsing engine 130 to processing modules 110 for storage in log 408a. User identifier 508 identifies the user who submits the queries being summarized in an entry 502. In an example system, each entry 502 is associated with queries submitted by one user. Account name 510 identifies the account used by a user to submit the queries summarized in an entry 502. In an example system, a user may use multiple accounts to submit queries to node 105, and each entry 502 is associated with one account name 510. Session identifier 512 identifies the session used by a user to communicate with node 105. In an example system, a user may establish multiple sessions to communicate with node 105, and each entry 502 is associated with one session identifier 512.

Query count 514 identifies the number of queries summarized by an entry 502. Query seconds 516 identifies the amount of processing time needed by node 105 to execute the queries summarized by an entry 502. Low histogram value 518 identifies the lowest execution time in a range of execution times associated with an entry 502. High histogram value 520 identifies the highest execution time in a range of execution times associated with an entry 502. Taken together, low histogram value 518 and high histogram value 520 identify the range of execution times associated with an entry 502. The queries that are summarized in an entry 502 have execution times that fall within the range of execution times defined by low histogram value 518 and high histogram value 520.

In one aspect of operation, a time bucket option is used to summarize queries executed by node 105. In an example system, a set of one or more entries 502 (denoted as 522a) is associated with this option, one entry 502 for each time bucket. The low histogram value 518 and high histogram value 520 in an entry 502 define the size of the time bucket associated with that entry 502. As a particular example, the first four entries 502 in log 408a define time buckets used to summarize queries. The first time bucket represents queries having an execution time of between zero and five seconds, the second time bucket represents queries having an execution time of between five and ten seconds, and the third time bucket represents queries having an execution time of between ten and fifteen seconds. The fourth time bucket represents queries having an execution time greater than fifteen seconds, where the value 65,535 represents a value used to represent infinity in a particular system. In an example system, the low histogram values 518 and high histogram values 520 used to establish the time buckets are provided by a user when a logging feature in node 105 is activated. In a particular system, the user provides three values X, Y, and Z when activating the logging feature, and these values are used to create four time buckets for execution times ranging from zero to X, X to Y, Y to Z, and greater than Z.

When logging is invoked with the time bucket option, dispatcher 210 initializes a set of counters, one for each time bucket. Dispatcher 210 also initializes a running execution time value for each bucket. The running execution time value identifies the total execution time for all queries counted by one of the counters. Dispatcher 210 identifies the execution time of each query executed by node 105 and identifies the time bucket that includes the identified execution time. Dispatcher 210 increments the counter associated with the identified time bucket and adds the execution time of the query to the running execution time value associated with the identified time bucket. The counter values and the running execution time values may also be stored in cache 402 as summarized query data 404a. As a particular example, non-zero counter values and non-zero running execution time values are stored in cache 402.

When a triggering event is detected, node 105 stores the summarized query data 404a in log 408a. For example, one or more processing modules 110 may receive the data 404a from parsing engine 130 and generate one or more entries 502 in log 408a. In an example system, a processing module 110 generates a new entry 502 in log 408a for each counter value received from parsing engine 130. As a particular example, the processing modules 110 may generate entries 502 and insert information into fields 504–520 of the newly created entries 502. This may include inserting the value of a counter into an entry 502 as query count 514 and inserting the running execution time value associated with the counter into entry 502 as query seconds 516. As shown in FIG. 5, if one of the counters has a value of zero, no corresponding entry 502 needs to be created in log 408a. This is illustrated in FIG. 5 in the second set of entries 522a, where no entry 502 is shown for execution times between five seconds and ten seconds. This may help to avoid consuming space in data-storage facility 120 to store entries 502 that summarize no queries.

In another aspect of operation, a threshold option is used to summarize queries executed by node 105. In an example system, one entry 502 (denoted as 522b) is associated with this option. The low histogram value 518 identifies the threshold time used to summarize the queries. The high histogram value 520 may have a value of zero, null, or any other suitable value. As a particular example, the fifth entry 502 in log 408a defines a threshold time used to summarize queries.

When logging is invoked with the threshold option, dispatcher 210 may initialize and use one counter and one running execution time value. Dispatcher 210 then identifies the execution time of each query executed by node 105. When a query has an execution time less than or equal to the threshold time, dispatcher 210 increments the counter and adds the execution time to the running execution time value. The counter value and the running execution time value may be stored in cache 402 as summarized query data 404a. When a query has an execution time greater than the threshold time, dispatcher 210 stores information about the query in cache 402 as full query data 404b.

In response to a triggering event, dispatcher 210 communicates at least a portion of query data 404 in cache 402 to one or more processing modules 110, and processing modules 110 update logs 408 using query data 404. For example, a processing module 110 could generate a new entry 502 in log 408a and insert the counter value and running execution time value into the new entry 502. The triggering event could, for example, represent query data 404 reaching eighty percent of the capacity of cache 402.

In an example system, each processing module 110 has access to a portion of log 408a. In a particular system, dispatcher 210 uses a processor identifier 504 and a collection timestamp 506 to perform a hash function. The hash function identifies the processing module 110 to receive a portion of the query data 404a to be stored in an entry 502 or a set of entries 522 in log 408a. In this way, the storage of query data 404a in log 408a can be divided among the processing modules 110, which may help to reduce the load placed on any one processing module 110. Query data 404a could also be provided to multiple processing modules 110 in any other suitable manner or to a single processing module 110.

Although FIG. 5 illustrates one example of a summarized query log 408a, various changes may be made to FIG. 5. For example, log 408a could store other or additional information about queries executed by node 105.

A full query log 408b, illustrated in FIG. 6, includes one or more entries 602. Each entry 602 includes information associated with a query executed by node 105. The fields shown in FIG. 6 are for illustration only. Other or additional fields can be used to describe queries executed by DBS 100. Also, the same or similar structure could be used in cache 402 to store full query data 404b.

Processor identifier 604 identifies the parsing engine 130 that processes the query associated with an entry 602. Collection timestamp 606 identifies the time when the cache 402 was initialized to store the information contained in entry 602. Query identifier 608 identifies the query associated with an entry 602. User identifier 610 identifies the user who submits the query associated with an entry 602. Account name 612 identifies the account used by a user to submit the query associated with an entry 602. Session identifier 614 identifies the session used by a user to communicate with node 105 and submit the query associated with an entry 602. Logical host identifier 616 identifies the host machine executing the session used by the user to communicate with node 105.

Figure 12:
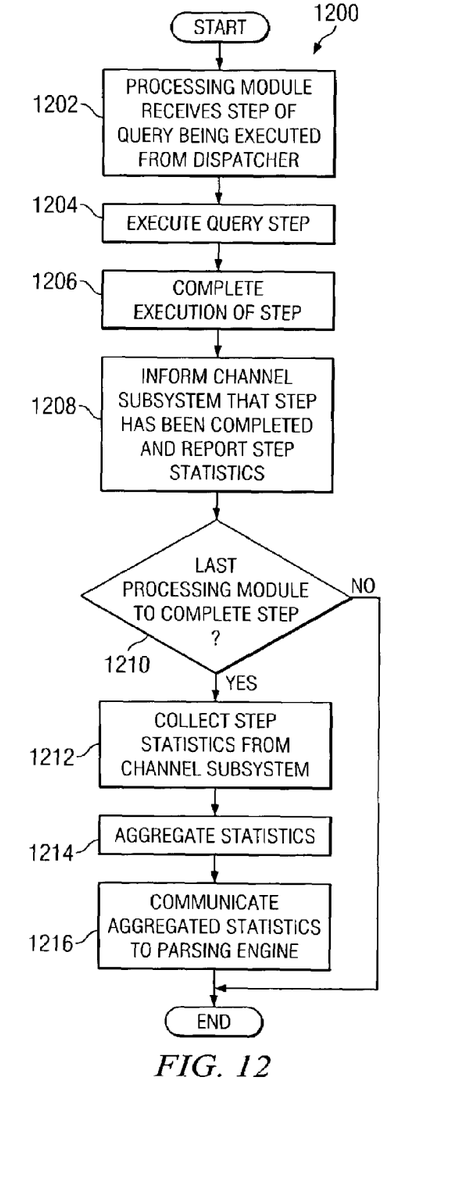
FIG. 12 is a flowchart of a method for collecting query statistics.

Start time 618 identifies the time that execution of the query associated with an entry 602 begins at parsing engine 130. As described above, parsing engine 130 executes a step building process to divide a query into one or more steps, and each step is sent to processing modules 110 by dispatcher 210 for execution. First step time 620 identifies the time that the first step associated with the query is dispatched to processing modules 110. First response time 622 identifies the time that the first response is sent to the host identified by logical host identifier 616. Last response time 624 identifies the time that the last response is sent to the host identified by logical host identifier 616. Number of steps value 626 identifies the total number of steps used to execute a query associated with an entry 602. Total CPU time value 628 identifies the execution time of a query, or the total amount of processing time used by one or more processing modules 110 to execute the query. Total I/O count value 630 identifies the total number of I/O operations performed by one or more processing modules 110 to execute the query associated with entry 602. A method for calculating the total CPU time value 628 and total I/O count value 630 is shown in FIG. 12, which is described below.

In one aspect of operation, queries for a user-account-session combination may be logged using a time bucket option and/or a threshold option. When the time bucket option is used, dispatcher 210 need not log any of the queries in log 408b. When the threshold option is used, node 105 logs a query in log 408b when the execution time of the query exceeds a threshold time. Because it may use less resources to log queries in summarized query log 404b than to log queries in full query log 408b, this may help to reduce the overhead imposed on DBS 100 by the logging feature.

Although FIG. 6 illustrates one example of a full query log 408b, various changes may be made to FIG. 6. For example, log 408b could store other or additional information about queries executed by node 105.

A query rules table 406, illustrated in FIG. 7, includes one or more entries 702. Each entry 702 includes information identifying whether and how queries are to be summarized in DBS 100. The fields shown in FIG. 7 are for illustration only. Other or additional fields can be used in table 406.

User identifier 704 identifies a user who may submit queries to node 105. Account name 706 identifies the account used by a user to submit queries to node 105. In a particular system, one entry 702 is associated with a particular user-account combination. Also, the entry 702 may be created when the user initiates query logging in DBS 100. In a particular system, the entry 702 may be created even when the user does not invoke query logging with the summary or threshold options.

Time bucket flag 708 identifies whether the logging feature of node 105 has been activated for the user-account combination using the time bucket option. Threshold flag 710 identifies whether the logging feature of node 105 has been activated for the user-account combination using the threshold option. In a particular system, the time bucket option and the threshold option are mutually exclusive and cannot be used at the same time for a user-account combination. In another example system, both options can be used at the same time for a user-account combination. For example, multiple time buckets could be established, and any query having an execution time that does not fall within one of the time buckets is fully logged.

If the time bucket flag 708 is active, entry 702 identifies a low value 712, a middle value 714, and a high value 716. These values 712–716 define the various time buckets used to summarize queries in node 105. For example, one time bucket may encompass execution times ranging from zero to the low value 712. Another time bucket may encompass execution times ranging from the low value 712 to the middle value 714. A third time bucket may encompass execution times ranging from the middle value 714 to the high value 716. A fourth time bucket may encompass execution times that are greater than the high value 716. Values 712–716 could, for example, be used as low histogram values 518 and high histogram values 520 in log 408a. If the threshold flag 710 is active, entry 702 identifies a threshold value 718 used to determine whether a query is counted in summarized query data 404a or fully logged in full query data 404b.

Although FIG. 7 illustrates one example of a query rules table 406, various changes may be made to table 406. For example, table 406 could store other or additional information about users submitting queries to node 105. Also, while table 406 is shown as including null (–) values, other suitable values could be used. In addition, both flags 708, 710 could have values of zero, indicating that queries are not summarized for a user-account combination.

FIG. 8 illustrates an express request 800 used to update a log 408. Express request 800 may, for example, be used by dispatcher 210 to communicate query data 404 to processing modules 110. In the illustrated example, request 800 includes a header 802, an express header 804, a row of data 806, and a buffer of rows 808. The structure of request 800 is for illustration only. Other requests could be used in DBS 100.

Header 802 represents a standard message header. Header 802 could, for example, contain a destination of request 800, such as the identity of one or more processing modules 110. Header 802 could also include error information used by processing module 110 to ensure that request 800 is received correctly. Express header 804 identifies request 800 as an express request. Express header 804 could, for example, identify the log 408 to be updated using the information in request 800. Row of data 806 includes information for one entry 502, 602 to be created in a log 408. Buffer of rows 808 includes information for zero or more additional entries 502, 602 to be created in a log 408.

In an example system, parsing engine 130 generates express request 800 without performing the step building process that normally occurs for queries and other commands executed by parsing engine 130. By eliminating the step building process, parsing engine 130 may be able to generate express requests 800 faster. This helps to reduce the load placed on parsing engine 130.

When a processing module 110 receives express request 800, processing module 110 identifies the log 408 to be updated. Processing module 110 also extracts the information contained in express request 800, generates one or more entries 502, 602 in log 408, and stores the extracted information in the one or more new entries 502, 602. In an example system, logs 408 may each be formed from one or more data blocks. In a particular system, processing module 110 writes information to an existing data block in a single write operation. In this system, processing module 110 also writes a new data block to data-storage facility 120 during a single write operation.

Although FIG. 8 illustrates one example of an express request 800 used to update a log 408, various changes may be made to request 800. For example, row of data 806 and buffer of rows 808 could be consolidated into a single element in request 800. Also, other or additional elements can be added to express request 800.

Figure 9:
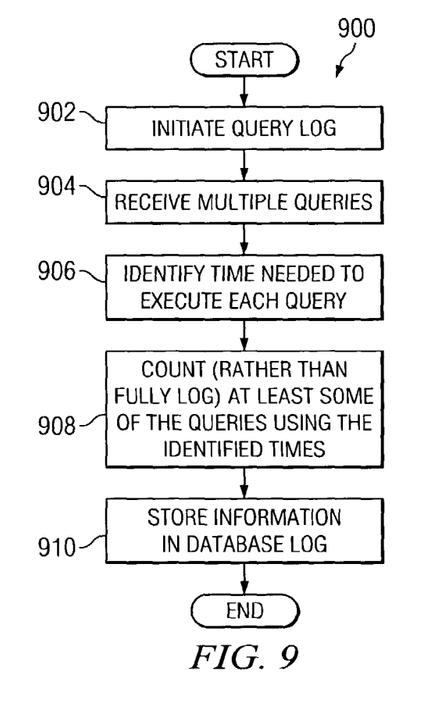
FIG. 9 is a flowchart of a method for logging database queries.

FIG. 9 is a flowchart of a method 900 for logging database queries. While method 900 may be described with respect to DBS 100 of FIG. 1, method 900 could also be used by any other suitable system.

Parsing engine 130 initiates a query log at block 902. This may include, for example, a user initiating logging using a command, such as with BEGIN QUERY LOGGING. The user could initiate logging with a time bucket option, such as with the command BEGIN QUERY LOGGING WITH SUMMARY ON USER1. The user could also initiate logging with a threshold option, such as the command BEGIN QUERY LOGGING WITH THRESHOLD ON USER1. This may also include dispatcher 210 initiating one or more counters.

Parsing engine 130 receives multiple queries from the user at block 904. This may include, for example, dispatcher 210 receiving queries from a mainframe 135 or a client 140. This may also include parsing engine 130 performing a step building process and dispatcher 210 communicating the steps to processing modules 110 for execution. Parsing engine 130 identifies the execution time for each query at block 906. This may include, for example, processing modules 110 using the method shown in FIG. 12 to measure the processing time used to execute each query.

Parsing engine 130 counts, rather than fully logging, at least some of the queries at block 908. This may include, for example, dispatcher 210 incrementing counters for one or more time buckets when the time bucket option is used. This may also include dispatcher 210 incrementing a counter if the execution time of a query falls below a threshold time when the threshold option is used. Parsing engine 130 stores the counters in a database log at block 910. This may include, for example, dispatcher 210 storing the values from one or more counters in cache 402 as summarized query data 404a. This may also include dispatcher 210 communicating summarized query data 404a to one or more processing modules 110. This may further include processing modules 110 storing the summarized query data 404a in log 408a.

Although FIG. 9 illustrates one example of a method 900 for logging database queries, various changes may be made to method 900. For example, parsing engine 130 need not store the values of the counters in a log depending on particular needs, such as when a counter has a value of zero.

Figure 10:
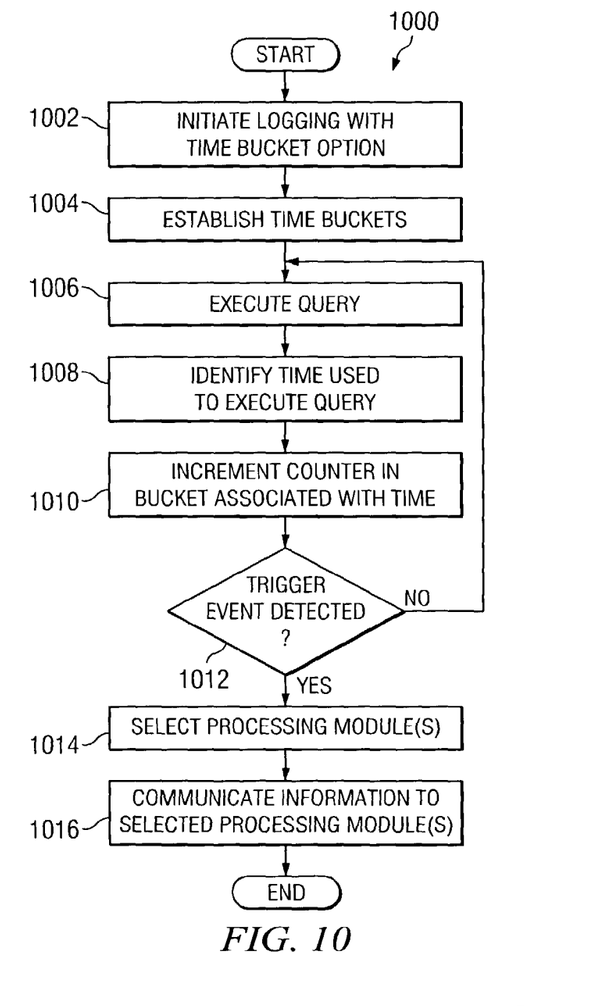
FIG. 10 is a flowchart of a method for summarizing database queries using time buckets.

FIG. 10 is a flowchart of a method 1000 for summarizing database queries using time buckets. While method 1000 may be described with respect to DBS 100 of FIG. 1, method 1000 could also be used by any other suitable system.

Parsing engine 130 initiates logging with a time bucket option at block 1002. This may include, for example, a user initiating logging using a command, such as BEGIN QUERY LOGGING WITH SUMMARY X, Y, Z ON USER1. Parsing engine 130 establishes one or more time buckets at block 1004. This may include, for example, dispatcher 210 initializes one or more counters and one or more running execution time values. As a particular example, counters could be associated with time windows defined using the X, Y, and Z parameters supplied in the BEGIN QUERY LOGGING command.

Parsing engine 130 executes a query at block 1006. This may include parsing engine 130 performing a step building process and dispatcher 210 communicating the steps to processing modules 110 for execution. Parsing engine 130 identifies the execution time for the query at block 1008. This may include, for example, dispatcher 210 identifying the processing time used by processing modules 110 to execute the query.

Parsing engine 130 increments a counter in the time bucket associated with the identified execution time at block 1010. This may include, for example, dispatcher 210 incrementing the counter associated with the time window in which the execution time falls. This may also include dispatcher 210 adding the execution time of the query to the running execution time value. The counter value and the running execution time could be stored in cache 402 as summarized query data 402.

Parsing engine 130 determines whether a triggering event is detected at block 1012. This may include, for example, dispatcher 210 detecting that a specified amount of time has elapsed, the query data 404 in cache 402 has reached a specified size or percentage of capacity, a command has been received from a user, or any other suitable trigger. If a triggering event is not detected, parsing engine 130 returns to block 1006 to execute and log another query.

If a triggering event is detected, parsing engine 130 selects one or more processing modules 110 at block 1014. This may include, for example, dispatcher 210 performing a hash using a processor identifier 504 and a collection timestamp 506. Parsing engine 130 communicates at least a portion of the query data 404 to the selected processing modules 110 at block 1016. This may include, for example, dispatcher 210 generating an express request 800 containing the query data 404.

Although FIG. 10 illustrates one example of a method 1000 for summarizing database queries using time buckets, various changes may be made to method 1000. For example, parsing engine 130 could always communicate query data 404 to the same processing module or modules 110 in response to the triggering event, so parsing engine 130 would not need to select one or more processing modules 110 at block 1014.

Figure 11:
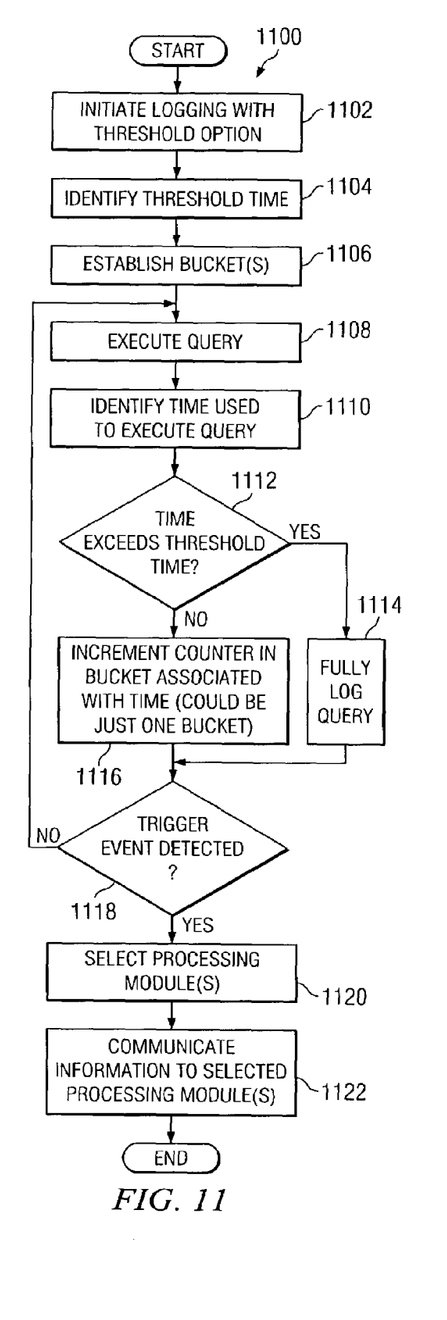
FIG. 11 is a flowchart of a method for summarizing database queries using a time threshold.

FIG. 11 is a flowchart of a method 1100 for summarizing database queries using a time threshold. While method 1100 may be described with respect to DBS 100 of FIG. 1, method 1100 could also be used by any other suitable system.

Parsing engine 130 initiates logging with a threshold option at block 1102. This may include, for example, a user initiating logging using a command, such as BEGIN QUERY LOGGING WITH THRESHOLD X ON USER1. Parsing engine 130 identifies a threshold time at block 1104. This may include, for example, dispatcher 210 identifying a threshold time using the X parameter supplied in the BEGIN QUERY LOGGING command. Parsing engine 130 establishes one or more buckets at block 1106. This may include, for example, dispatcher 210 initializing a counter to count all queries having an execution time below the threshold. The counter could also have an associated running execution time value.

Parsing engine 130 executes a query at block 1108. This may include, for example, parsing engine 130 performing a step building process and dispatcher 210 communicating the steps to processing modules 110 for execution. Parsing engine 130 identifies the execution time for the query at block 1110. This may include, for example, dispatcher 210 identifying the processing time used by processing modules 110 to execute the query.

Parsing engine 130 compares the execution time of the query to the threshold time at block 1112. If the execution time exceeds the threshold time, parsing engine 130 fully logs the query at block 1114. This may include, for example, dispatcher 210 storing information about the query as full query data 404b in cache 402. If the execution time equals or falls below the threshold time, parsing engine 130 increments a counter in one of the buckets at block 1116. If multiple buckets are used, this may include dispatcher 210 selecting one of the buckets, such as by using the execution time of the query to select a bucket, and incrementing the counter associated with that bucket.

Parsing engine 130 determines whether a triggering event is detected at block 1118. If a triggering event is not detected, parsing engine 130 returns to block 1108 to execute and log another query. Otherwise, parsing engine 130 selects one or more processing modules 110 at block 1124. Parsing engine 130 communicates at least a portion of the query data 404 in cache 402 to the selected processing modules 110 at block 1126.

Although FIG. 11 illustrates one example of a method 1100 for summarizing database queries using a time threshold, various changes may be made to method 1100. For example, parsing engine 130 could always communicate query data 404 to the same processing module or modules 110 in response to the triggering event, so parsing engine 130 would not need to select one or more processing modules 110 at block 1120.

FIG. 12 is a flowchart of a method for collecting query statistics. While method 1200 may be described with respect to DBS 100 of FIG. 1, method 1200 could also be used by any other suitable system.

A processing module 110 receives a step of a query being executed from dispatcher 210 at block 1202. This may include, for example, processing module 110 receiving the step over network 115. In an example system, multiple processing modules 110 can receive the same step over network 115. Processing module 110 executes the step of the query at block 1204. This may include, for example, processing module 110 accessing data-storage facility 120. This may also include processing module 110 retrieving data from data-storage facility 120. This could further include processing module 110 combining the retrieved data with other data retrieved from data-storage facility 120. Processing module 110 completes execution of the step of the query at block 1206. This may include, for example, processing module 110 identifying the amount of processing time needed to fully execute the step of the query at processing module 110 and the number of I/O operations performed by processing module 110 during the execution of the step.

Processing module 110 informs a channel subsystem that the step has been completed and reports step statistics to the channel subsystem at block 1208. The channel subsystem may, for example, represent part of the parallel database extension used to facilitate communication by multiple processing modules 110 over network 115. The step statistics reported to the channel subsystem may include the identified processing time and the number of I/O operations. Other or additional step statistics could also be reported.

Processing module 110 determines whether it was the last processing module 110 to complete execution of the step at block 1210. This may include, for example, the channel subsystem informing the processing module 110 if it was the last to complete execution of the step. If processing module 110 was not the last to complete execution of the step, method 1200 ends. Otherwise, processing module 110 was the last to complete execution of the step, and processing module 110 collects the step statistics from the channel subsystem at block 1212. This may include, for example, processing module 110 receiving the step statistics produced by all of the processing modules 110. Processing module 110 aggregates the step statistics at block 1214. This may include, for example, processing module 110 identifying the total amount of processing time needed by all processing modules 110 to fully execute the step and the total number of I/O operations performed by all processing modules 110 during execution of the step. Processing module 110 communicates the aggregated statistics to parsing engine 130 at block 1216. This may include, for example, processing module 110 communicating the total processing time and total number of I/O operations to dispatcher 210.

At this point, the parsing engine 130 can use the step statistics to log database queries. For example, dispatcher 210 could use the step statistics to determine whether to summarize or fully log the query step or the entire query. As particular examples, dispatcher 210 could use the total processing time to determine which time bucket the query is associated with or to determine whether the execution time of the query exceeds a threshold.

Although FIG. 12 illustrates one example of a method 1200 for collecting query statistics, various changes may be made to method 1200. For example, other techniques for aggregating step statistics could be used in DBS 100.

The text above described one or more specific embodiments of a broader invention. The invention also is carried out in a variety of alternative embodiments and thus is not limited to those described here. For example, while the invention has been described here in terms of a DBMS that uses a massively parallel processing ("MPP") architecture, other types of database systems, including those that use a symmetric multiprocessing ("SMP") architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for logging database queries, comprising:
   receiving a request to log a plurality of database queries, each database query associated with an execution time period;
   initializing a plurality of counters, each counter associated with a range of execution time periods;
   for each database query, incrementing the counter having an associated time range that includes the execution time of the database query; and
   for each counter, logging information aggregated from all of the database queries that caused the counter to be incremented, whereby none of the database queries are fully logged.

2. The computer-implemented method of claim 1, wherein the aggregate information comprises information associated with at least some of one or more steps associated with each of the at least some database queries.

3. A computer-implemented method for logging database queries, comprising:
   receiving a request to log a plurality of database queries, each database query associated with an execution time period;
   for each database query, comparing the execution time of the database query to a threshold time specified in the request; and
   summarizing the database query when the execution time is less than the threshold time.

4. The computer-implemented method of claim 3, further comprising fully logging the database query when the execution time is greater than the threshold time.

5. The computer-implemented method of claim 3, wherein summarizing the database query comprises summarizing the database query in a cache; and further comprising updating the log with at least a portion of contents of the cache in response to a triggering event.

6. The computer-implemented method of claim 5, wherein updating the log comprises communicating the at least a portion of contents of the cache to a selected one of a plurality of processing modules maintaining at least a portion of the log.

7. The computer-implemented method of claim 6, wherein:
   the log comprises one or more data blocks; and
   the selected processing module updates the log by at least one of updating an existing data block in a single operation and writing a new data block in a single operation.

8. The computer-implemented method of claim 6, wherein a parsing engine performs a step building process to generate a plurality of steps used to implement one of the queries; and
   communicating the at least a portion of the contents of the cache to the identified processing module comprises:
      generating an express request comprising the at least a portion of contents of the cache, the express request generated by the parsing engine without performing the step building process; and
      communicating the express request to the selected processing module.

9. The computer-implemented method of claim 5, wherein the triggering event comprises one of a timer elapsing, a specified time being reached, a specified interval of time elapsing, and a command from a user.

10. A system for logging database queries, comprising:
    a memory operable to store a table; and
    one or more processors collectively operable to:
       receive a request to log a plurality of database queries, each database query associated with an execution time period;
       for each database query, compare the execution time of the database query to a threshold time specified in the request; and
       summarize the database query in the table when the execution time is less than the threshold time.

11. The system of claim 10, wherein the one or more processors are further collectively operable to fully log the database query when the execution time is greater than the threshold time.

12. The system of claim 10, further comprising a cache; and wherein the one or more processors are further collectively operable to update the table with at least a portion of contents of the cache in response to a triggering event.

13. The system of claim 12, wherein the one or more processors are collectively operable to update the table by communicating the at least a portion of contents of the cache to a selected one of a plurality of processing modules maintaining at least a portion of the table.

14. The system of claim 13, wherein:
    the table comprises one or more data blocks; and
    the selected processing module updates the log by at least one of updating an existing data block in a single operation and writing a new data block in a single operation.

15. The system of claim 13, wherein:
    the one or more processors are further collectively operable to perform a step building process to generate a plurality of steps used to implement one of the queries; and
    the one or more processors are collectively operable to communicate the at least a portion of contents of the cache to the selected processing module by:

generating an express request comprising the at least a portion of contents of the cache, the express request generated without performing the step building process; and communicating the express request to the selected processing module.

16. The system of claim 12, wherein the one or more processors are further collectively operable to fully log at least one of the database queries by writing an entry to the cache, the entry written in a file system format such that a processing module can receive the entry and write the entry to a second log without reformatting the entry.

17. The system of claim 10, wherein the one or more processors are collectively operable to summarize at least some of the database queries by summarizing at least some of one or more steps associated with each of the at least some database queries.

18. A system for logging database queries, comprising:
a memory operable to store and facilitate retrieval of information;
one or more processors collectively operable to:
receive a request to log a plurality of database queries, each database query associated with an execution time period;
initialize a plurality of counters, each counter associated with range of execution time periods;
for each database query, increment the counter having an associated time range that includes the execution time of the database query; and
for each counter, log information aggregated from all of the database queries that caused the counter to be incremented, whereby none of the database queries are fully logged.

19. A computer-implemented method for logging database queries, comprising:
receiving a request to log a plurality of database queries, each database query associated with an execution time period;
initializing a plurality of counters, each counter associated with a range of execution time periods;
for each database query, incrementing the counter having an associated time range that includes the execution time of the database query;
storing the counters in one of a plurality of logs;
summarizing at least some of the database queries in a cache; and
updating at least one of the plurality of logs with at least a portion of the contents of the cache.

20. A computer-implemented method for logging database queries, comprising:
receiving a request to log a plurality of database queries, each database query associated with an execution time period;

for each database query, comparing the execution time of the database query to a threshold time;
summarizing the database query in one of the plurality of logs when the execution time is less than the threshold time; and
fully logging the database query in another of the plurality of logs when the execution time of the database query is greater than the threshold time, wherein fully logging a database query comprises writing an entry to a cache, the entry written in a file system format such that a processing module can receive the entry and write the entry to a log without reformatting the entry.

21. A system for logging database queries, comprising:
a cache;
a memory operable to store a plurality of tables; and
one or more processors collectively operable to:
receive a request to log a plurality of database queries, each database query associated with an execution time period;
initialize a plurality of counters, each counter associated with range of execution time periods;
update at least one of the Plurality of tables with at least a portion of contents of the cache;
for each database query, increment the counter having an associated time range that includes the execution time of the database query; and
store the counters in one of the plurality of tables.

22. A system for logging database queries, comprising:
a memory operable to store a plurality of tables; and
one or more processors collectively operable to:
receive a request to log a plurality of database queries, each database query associated with an execution time period;
for each database query, compare the execution time of the database query to a threshold time;
summarize the database query in one of the plurality of tables when the execution time is less than the threshold time; and
fully log the database query in another of the plurality of tables when the execution time of the database query is greater than the threshold time, wherein fully logging a database query comprises writing an entry to a cache, the entry written in a file system format such that a processing module can receive the entry and write the entry to a log without reformatting the entry.

* * * * *